United States Patent
Chen et al.

(10) Patent No.: US 10,117,279 B2
(45) Date of Patent: Oct. 30, 2018

(54) METHOD FOR MAINTENANCE OF MAXIMUM NUMBER OF BEARERS WHEN MAXIMUM NUMBER OF BEARERS REACHED

(71) Applicant: MEDIATEK INC., Hsinchu (TW)

(72) Inventors: Chi-Hsien Chen, Taipei (TW); Po-Ying Chuang, Taipei (TW); Chien-Chun Huang-Fu, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 284 days.

(21) Appl. No.: 14/884,913

(22) Filed: Oct. 16, 2015

(65) Prior Publication Data

US 2016/0113054 A1    Apr. 21, 2016

Related U.S. Application Data

(60) Provisional application No. 62/065,145, filed on Oct. 17, 2014.

(51) Int. Cl.
| | | |
|---|---|---|
| *H04W 36/28* | (2009.01) | |
| *H04W 36/00* | (2009.01) | |
| *H04W 76/18* | (2018.01) | |
| *H04W 76/02* | (2009.01) | |
| H04W 76/16 | (2018.01) | |
| H04W 76/50 | (2018.01) | |

(52) U.S. Cl.
CPC ..... *H04W 76/027* (2013.01); *H04W 36/0027* (2013.01); *H04W 36/28* (2013.01); *H04W 76/18* (2018.02); *H04W 76/16* (2018.02); *H04W 76/50* (2018.02)

(58) Field of Classification Search
CPC . H04W 28/0252; H04W 76/10; H04W 76/18; H04W 36/28; H04W 36/0027
See application file for complete search history.

(56) References Cited

U.S. PATENT DOCUMENTS

| | | | |
|---|---|---|---|
| 2010/0279704 A1 | 11/2010 | Vachhani | 455/453 |
| 2012/0207129 A1 | 8/2012 | Sun | 370/331 |

(Continued)

FOREIGN PATENT DOCUMENTS

| | | |
|---|---|---|
| CN | 103906082 A | 1/2008 |
| CN | 101924633 A | 6/2009 |

(Continued)

OTHER PUBLICATIONS

International Search Report and Written Opinion of International Search Authority for PCT/CN2015/092178 dated Jan. 20, 2016 (10 pages).

(Continued)

*Primary Examiner* — Omer S Mian
(74) *Attorney, Agent, or Firm* — Imperium Patent Works; Zheng Jin

(57) ABSTRACT

A method of maintaining maximum number of bearers when maximum number of bearers reached is proposed. An enhanced SM/ESM procedure is proposed to synchronize between UE and network and to determine a precise maximum bearer number for protecting network resource and improving user experience. The UE determines the maximum bearer number based on a cause code contained in an SM reject message and updates the number under various network scenarios including system change.

16 Claims, 7 Drawing Sheets

(56) References Cited

U.S. PATENT DOCUMENTS

| | | | |
|---|---|---|---|
| 2013/0258998 A1 | 10/2013 | Ramachandran et al. | 370/331 |
| 2013/0286935 A1 | 10/2013 | Yerrabommanahalli et al. | 370/328 |
| 2013/0301547 A1 | 11/2013 | Gupta et al. | 370/329 |
| 2014/0105125 A1 | 4/2014 | Chaponniere et al. | 370/329 |
| 2014/0204736 A1 | 7/2014 | Bakker et al. | 370/230 |
| 2014/0215081 A1 | 7/2014 | Cili et al. | 709/227 |
| 2014/0295824 A1 | 10/2014 | Madasamy | 455/424 |
| 2015/0181639 A1 | 6/2015 | Liu | 370/329 |
| 2015/0351136 A1* | 12/2015 | Kaura | H04W 76/066 370/329 |
| 2015/0358898 A1 | 12/2015 | Lair et al. | 455/434 |
| 2015/0373770 A1 | 12/2015 | Niemi et al. | 370/329 |
| 2016/0065486 A1* | 3/2016 | Hariharan | H04L 47/726 709/226 |
| 2016/0345243 A1 | 11/2016 | Zaus et al. | 455/435.2 |

FOREIGN PATENT DOCUMENTS

| | | |
|---|---|---|
| CN | 101969637 A | 7/2009 |
| CN | 102984815 A | 12/2012 |

OTHER PUBLICATIONS

3GPP TSG-CT WG1 Meeting #86 C1-140280, Change Request, Huawei et al., Guangzhou, P.R. of China dated Jan. 20-24, 2014 (3 pages).

3GPP TSG-CT WG1 Meeting #86 C1-140433, Change Request, Huawei et al., Guangzhou, P.R. of China dated Jan. 20-24, 2014 (3 pages).

International Search Report and Written Opinion of International Search Authority for PCT/CN2015/092179 dated Feb. 2, 2016 (13 pages).

USPTO, Office Action for related U.S. Appl. No. 14/884,896 dated Jan. 25, 2017.

* cited by examiner

Upon receipt of the SM/ESM request message, the network may reject the request with a cause code, including:

- #8: operator determined barring;
- #26: insufficient resources;
- #27: missing or unknown APN;
- #28: unknown PDN type;
- #29: user authentication failed;
- #30: request rejected by Serving GW or PDN GW;
- #31: request rejected, unspecified;
- #32: service option not supported;
- #33: requested service option not subscribed;
- #34: service option temporarily out of order;
- #35: PTI already in use;
- #38: network failure;
- #50: PDN type IPv4 only allowed;
- #51: PDN type IPv6 only allowed;
- #53: ESM information not received;
- #54: PDN connection does not exist;
- #55: multiple PDN connections for a given APN not allowed;
- #65: maximum number of EPS bearers reached;
- #66: requested APN not supported in current RAT and PLMN combination;
- #95-111: protocol errors;
- #112: APN restriction value incompatible with active EPS bearer context.

FIG. 3

METHOD FOR MAINTENANCE OF MAXIMUM NUMBER OF BEARERS WHEN MAXIMUM NUMBER OF BEARERS REACHED

CROSS REFERENCE TO RELATED APPLICATIONS

This application claims priority under 35 U.S.C. § 119 from U.S. Provisional Application No. 62/065,145 filed on Oct. 17, 2014, the subject matter of which is incorporated herein by reference.

TECHNICAL FIELD

The disclosed embodiments relate generally to wireless communication, and, more particularly, to method for maintaining maximum number of bearers when maximum number of bearers reached.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). The $3^{rd}$ generation partner project (3GPP) network normally includes a hybrid of 2G/3G/4G systems. With the optimization of the network design, many improvements have developed over the evolution of various standards.

The main function of the Session Management (SM) for 2G/3G systems or Evolved Packet System (EPS) SM (ESM) for 4G systems is to support Packet Data Protocol (PDP) context or EPS bearer handling of the user terminal. SM procedures include PDP context activation procedure, secondary PDP context activation procedure, PDP context modification or deactivation procedure, and MBMS corresponding procedures. ESM procedures include PDN connectivity or disconnect procedures and Bearer resource allocation or modification procedures. To establish an EPS bearer in the 4G system, a UE sends a PDN connectivity request to the network. Upon reception of the SM/ESM request message, the network may reject the request with a cause code. For example, one of the cause code is #65—Maximum number of EPS Bearers Reached—indicating that a UE has already reached the maximum number of EPS bearers.

There are a few issues associated with the maximum number of EPS bearers. First, after the maximum number of active EPSB is reached, the UE may get another request from the network for activating a new EPSB. The UE behavior is not defined under such scenario. Second, the maximum number of bearers is RAT Radio Access Technology (RAT) dependent. If the number of active bearer exceeds the maximum number when system/RAT changes, the UE behavior is also not defined under such scenario. The undefined UE behavior will result in problems when the maximum bearer number is un-synced between the UE side and the network side. If the maximum bearer number at the UE side is higher than the network side, then the network will receive unexpected air message and cause resource wasted. On the other hand, if the maximum bearer number at the UE side is lower than the network side, then the UE will over-restrict and not send out PDN connectivity request, which cause degraded user experience.

A solution is sought for maintaining a precise maximum number of bearers when the maximum number of EPS bearers has reached.

SUMMARY

A method of maintaining maximum number of bearers when maximum number of bearers reached is proposed. An enhanced SM/ESM procedure is proposed to synchronize between UE and network and to determine a precise maximum bearer number for protecting network resource and improving user experience. The UE determines the maximum bearer number based on a cause code contained in an SM reject message and updates the number under various network scenarios including system change.

In one embodiment, a UE receives a session management (SM) reject message in a mobile communication network. The SM reject message comprises a cause code indicating that a maximum number of bearers has been reached. The UE determines the maximum number of bearers based on the SM reject message. The UE receives a subsequent SM request from the network. The subsequent SM request is associated with a set of parameters. The UE updates the maximum number of bearers based on the SM request and the set of parameters. The UE accepts the subsequent SM request to establish a new bearer.

In another embodiment, a UE determines a first maximum number of bearers for a first radio access technology (RAT) in a mobile communication network. The UE determines a second maximum number of bearers for a second RAT. The UE establishes a number of active bearers in the second RAT. The UE changes from the second RAT to the first RAT with the number of active bearers. The UE updates the first maximum number of bearers based on the number of active bearers and a set of parameters.

In yet another embodiment, a network controller determines a change condition for a maximum number of bearers. The maximum number of bearers is a limit for a UE to establish bearers using a session management procedure. The network determines whether the UE has reached the maximum number of bearers. The maximum number of bearers is dependent on a radio access technology (RAT) or an access point name (APN). The network transmits an information element (IE) to the UE when the change condition is satisfied. The IE contains a MAX_BEARER_NUMBER to explicitly indicate the maximum number of bearers. In one example, the change condition is satisfied when the UE has reached the maximum number of bearers, and wherein the IE is carried by an SM reject message. In another example, the change condition is satisfied when the UE encounters a RAT change, and wherein the IE is carried by a tacking area update (TAU) or a routing area update (RAU).

In yet another embodiment, a base station establishes a radio resource control (RRC) connection with a user equipment (UE) in a mobile communication network. The base station transmits an information element (IE) to the UE. The IE contains a MAX_BEARER_NUMBER to explicitly indicate a maximum number of bearers. The base station transmits an updated MAX_BEARER_NUMBER to the UE when the UE encounters a radio access technology (RAT) change or when a MAX_BEARER_NUMBER configuration of the current RAT is changed.

BRIEF DESCRIPTION OF THE DRAWINGS

The accompanying drawings, where like numerals indicate like components, illustrate embodiments of the invention.

FIG. 3 illustrates an exemplary list of cause codes associated with an unsuccessful SM/ESM procedure initiated by a UE.

DETAILED DESCRIPTION

Reference will now be made in detail to some embodiments of the invention, examples of which are illustrated in the accompanying drawings.

Figure 1:
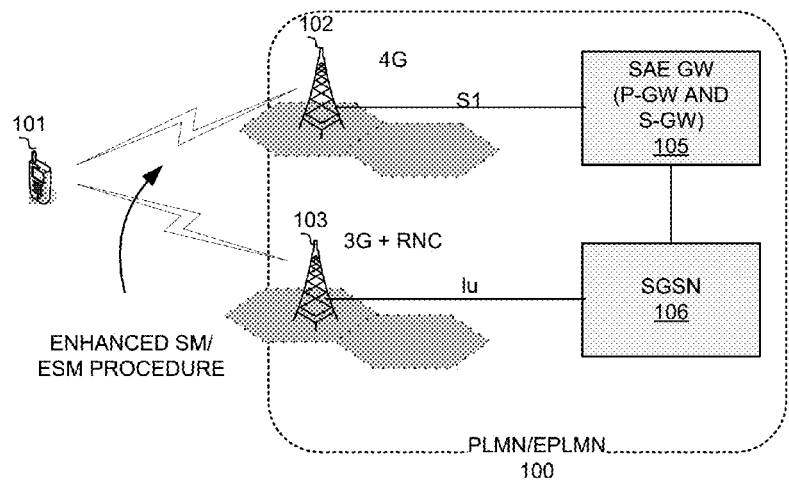
FIG. 1 illustrates an exemplary 3GPP wireless network with an enhanced session management procedure in accordance with one novel aspect.

FIG. 1 illustrates an exemplary 3GPP system 100 with an enhanced session management procedure in accordance with one novel aspect. 3GPP system 100 is a Public Land Mobile Network (PLMN) or an Equivalent Public Land Mobile Network (EPLMN) that supports one or more wireless radio network access (RAT) networks, such a 4G/LTE system, a 3G system, and possibly a 2G system (not shown). Each of the 3GPP system has a fixed base infrastructure unit, such as wireless communications stations 102 and 103, forming wireless networks distributed over a geographical region. The base unit may also be referred to as an access point, an access terminal, a base station, a NodeB, an eNodeB, or by other terminology used in the art. Each of the wireless communications stations 102 and 103 serves a geographic area. A 4G/LTE system has a evolved node-B (eNodeB) 102 connecting with a system architecture evolution (SAE) gateway 105, which includes the serving gateway (S-GW) and the packet data network (PDN) gateway (P-GW) via the S1 interface. A 3G system has a node-B 103 and a radio network controller (RNC). The RNC of the 3G system connects with a serving GPRS support node (SGSN) 106, which is connected to SAE gateway 105.

A wireless communications device/user equipment (UE) 101 in 3GPP wireless network 100 can be served by eNodeB 102 or by node-B 103. UE 101 establishes a bearer with 3GPP system 100 for data services. UE 101 establishes EPS bearer in the 4G system via the S1 interface, or establishes a PDP context in the 3G system via the Iu interface. Session Management (SM) procedures for 3G/2G systems or Evolved Packet System (EPS) SM (ESM) procedures for 4G systems are applied by UE 101 to support Packet Data Protocol (PDP) context or EPS bearer handling of the user terminal. For example, SM procedures include PDP context activation procedure, secondary PDP context activation procedure, PDP context modification or deactivation procedure, and MBMS corresponding procedures. Similarly, ESM procedures include PDN connectivity or disconnect procedures and Bearer resource allocation or modification procedures. Note that in the following discussion, "SM" is used as a generic term to represent both session management (SM) for 2G/3G systems, as well as EPS session management (ESM) for 4G systems. Similarly, an SM request or SM reject message is used to represent connection/bearer request or reject in all systems.

In the example of FIG. 1, to establish an EPS bearer in the 4G system, UE 101 sends a PDN connectivity request to eNodeB 102. Upon receipt of the PDN connectivity request message, the network may reject the request with a cause code. For example, one of the cause code is #65—Maximum number of EPS Bearers Reached—indicating that a UE has already reached the maximum number of EPS bearers. However, after the maximum number of active EPSB is reached, the UE may get another request from the network for activating a new EPSB. The UE behavior is not defined under such scenario. Further, the maximum number of bearers is RAT-dependent. If the number of active bearers exceeds the maximum number of bearers when the system/RAT changes, then the UE behavior is also not defined under such scenario.

The undefined UE behavior will result in problems when the maximum bearer number is un-synced between the UE side and the network side. If the maximum bearer number at the UE side is higher than the network side, then the network will receive unexpected air message and cause resource wasted. On the other hand, if the maximum bearer number at the UE side is lower than the network side, then the UE will over-restrict and not send out PDN connectivity request, which cause degraded user experience. In one novel aspect, an enhanced SM/ESM procedure is proposed to resolve the un-synced problem and to determine a precise maximum bearer number for protecting network resource and improving user experience.

Figure 2:
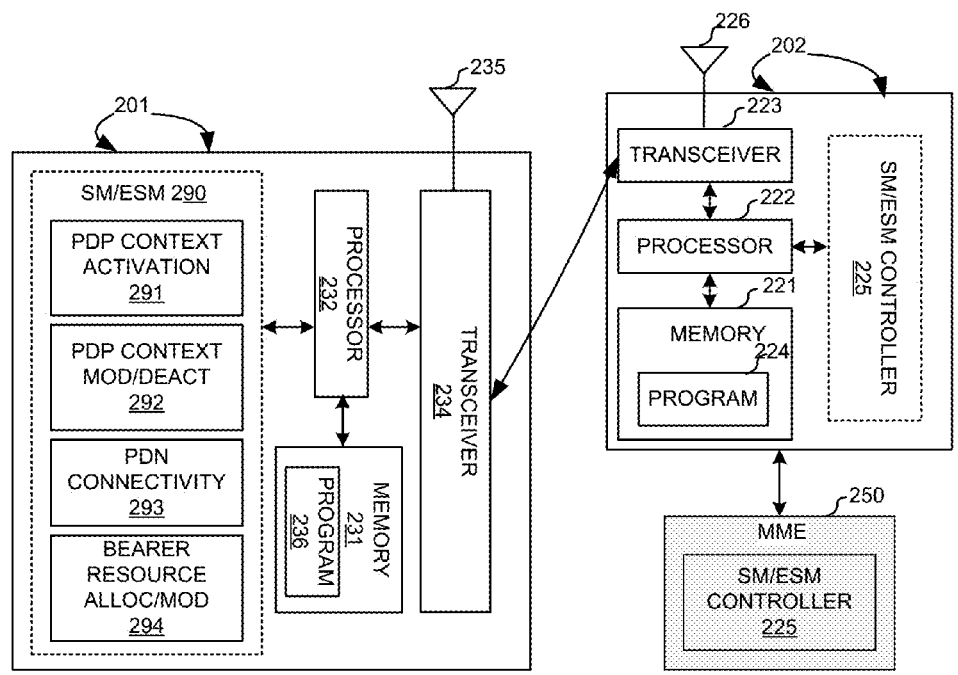
FIG. 2 illustrates simplified block diagrams of a user equipment and a base station in accordance with embodiments of the current invention.

FIG. 2 illustrates simplified block diagrams of a user equipment UE 201 and a base station BS 202 in accordance with embodiments of the current invention. BS 202 has an antenna 226, which transmits and receives radio signals. A RF transceiver module 223, coupled with the antenna, receives RF signals from antenna 226, converts them to baseband signals and sends them to processor 222. RF transceiver 223 also converts received baseband signals from processor 222, converts them to RF signals, and sends out to antenna 226. Processor 222 processes the received baseband signals and invokes different functional modules to perform features in base station 202. Memory 221 stores program instructions and data 224 to control the operations of base station 202. Base station 202 also includes a set of control circuits, such as a SM/ESM controller 225 that carry out functional tasks for enhanced session management features in the 3GPP network. In an alternative embodiment, the SM/ESM controller is located in a mobility management entity (MME) 250 within the evolved packet core (EPC), which performs the enhanced session management features in the 3GPP network.

Similarly, UE 201 has an antenna 235, which transmits and receives radio signals. A RF transceiver module 234, coupled with the antenna, receives RF signals from antenna 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in the mobile station 201. Memory 231 stores program instructions and data 236 to control the operations of the mobile station 201.

UE 201 also includes a set of control circuits that carry out functional tasks. An SM/ESM controller 290 supports PDP context and EPS bearer handling in the 3GPP system. For example, the SM/ESM controller further comprises a PDP context activation handler 291 for activating PDP context in 3G systems, a PDP context modification and/or deactivation handler 292 for 3G systems, a PDN connectivity handler 293 for establishing PDN connection in 4G systems, and an EPS bearer resource allocation/modification handler 294 for 4G systems. The PDN connectivity handler 293 may further comprise an error cause code handler for handling various cause codes upon unsuccessful PDN connectivity procedure. In one embodiment, the error cause code handler receives a cause code indicating that a maximum bearer number has reached. UE 201 then determines the maximum bearer number based on the cause code and a set of parameters.

FIG. 3 illustrates an exemplary list of cause codes associated with an unsuccessful SM/ESM procedure initiated by a UE. To initiate an SM/ESM procedure, the UE sends an SM/ESM request to the network. The network may reject the request with a cause code. As depicted by table 300 of FIG. 3, the list of cause code includes:

8: operator determined barring;
26: insufficient resources;
27: missing or unknown APN;
28: unknown PDN type;
29: user authentication failed;
30: request rejected by Serving GW or PDN GW;
31: request rejected, unspecified;
32: service option not supported;
33: requested service option not subscribed;
34: service option temporarily out of order;
35: PTI already in use;
38: network failure;
50: PDN type IPv4 only allowed;
51: PDN type IPv6 only allowed;
53: ESM information not received;
54: PDN connection does not exist;
55: multiple PDN connections for a given APN not allowed;
65: maximum number of EPS bearers reached;
66: requested APN not supported in current RAT and PLMN combination;
95-111: protocol errors;
112: APN restriction value incompatible with active EPS bearer context.

Among the various cause code, code #65 indicates that a maximum number of EPS bearers has been reached already. Upon receiving this error code, the UE is not allowed to transmit additional ESM request to establish more EPS bearers. However, the UE may get another request from the network for activating a new EPS bearer. For example, the UE has established an EPS bearer for IP Multimedia Subsystem (IMS) registration and the UE has reached the maximum number of EPS bearers. Later on, the network tries to establish another EPS bearer for IMS voice call, thus sends another activate dedicated EPS bearer context request to the UE. Under such scenario, the UE may keep the original maximum bearer number, or update to a new maximum bearer number, or reset the maximum bearer number based on a set of parameters including the APN and the PDN/PDP type. Note that some of the following embodiments are for 4G scenarios. However, 2G or 3G scenarios are also applicable.

Figure 4:
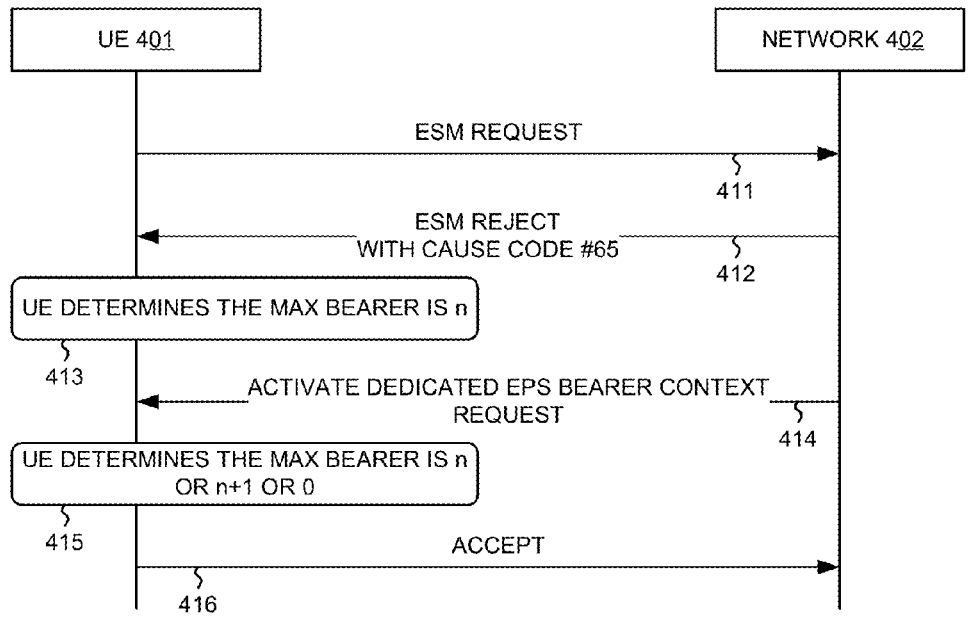
FIG. 4 illustrates a first embodiment of maintaining maximum number of bearers when the maximum number of bearers has reached.

FIG. 4 illustrates a first embodiment of maintaining maximum number of bearers when the maximum number of bearers has reached. In step 411, UE 401 sends an ESM request to network 402 to establish an EPS bearer for data service. In step 412, the network sends an ESM reject message back to UE 401. The ESM reject message comprises a cause code #65—"maximum number of EPS bearers reached"—indicating that the UE has already reached its maximum number of bearers. In step 413, the UE determines the maximum number of bearers is n based on the cause code. For example, if the UE currently has four EPS bearers alive when receiving the cause code, then the UE knows that the maximum number of bearers is n=4. Upon such determination, the UE is prohibited from sending additional SM request to the network if the UE already has four EPS bearers alive. In step 414, the network transmits another SM request to the UE to activate another dedicated EPS bearer context. In step 415, the UE determines an updated value for the maximum bearer number based on a set of parameters associated with the SM request. Finally, in step 416, the UE accepts the SM request.

The updated value for the maximum number of EPS bearers can be determined based on several options under different scenarios. In a first option, the UE keeps the maximum number of EPS bearers the same (n) as determined in step 413. The UE may make such determination if the connection activated by the network in step 414 is to the existing APN/PDN type. For example, the maximum number of bearers remains to be n=4. In a second option, the UE increments the maximum number of EPS bearers by one (n+1). The UE may make such determination if the connection activated by the network in step 414 is to a new APN/PDN type. For example, the updated maximum number of bearers is n+1=5. In a third option, the UE resets the maximum number of EPS bearers to be n=0. If the UE resets the value to zero, the maximum number can be resynced with the network later on.

Figure 5:
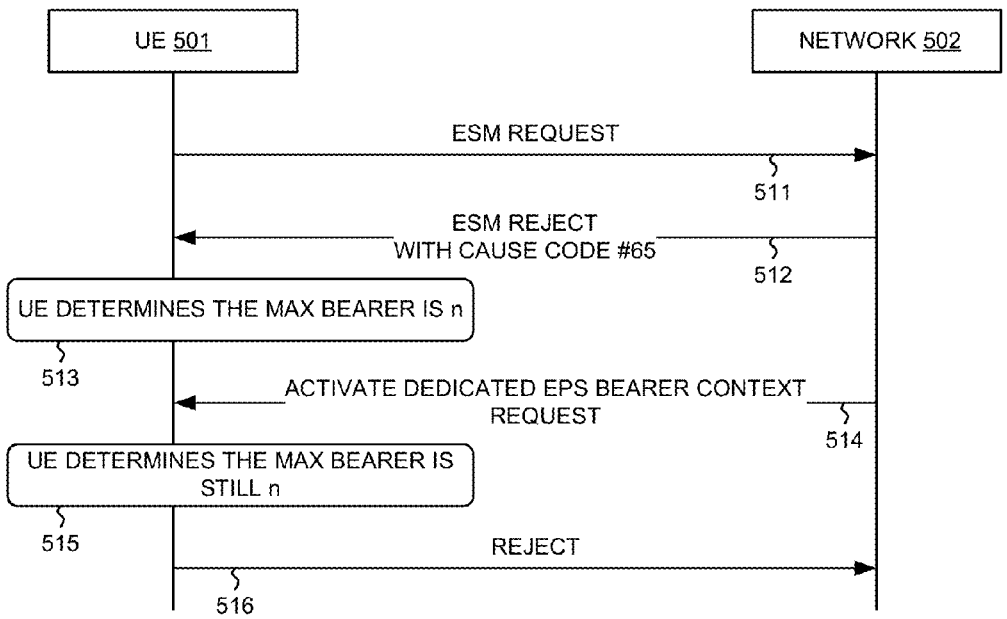
FIG. 5 illustrates a second embodiment of maintaining maximum number of bearers when the maximum number of bearers has reached.

FIG. 5 illustrates a second embodiment of maintaining maximum number of bearers when the maximum number of bearers has reached. This embodiment is similar to the embodiment of FIG. 4. In step 511, UE 501 sends an ESM request to network 502 to establish an EPS bearer for data service. In step 512, the network sends an ESM reject message back to UE 501. The ESM reject message comprises a cause code #65—"maximum number of EPS bearers reached"—indicating that the UE has already reached its maximum number of bearers. In step 513, the UE determines the maximum number of bearers is n based on the cause code. For example, if the UE currently has four EPS bearers alive when receiving the cause code, then the UE knows that the maximum number of bearers is n=4. Upon such determination, the UE is prohibited from sending additional SM request to the network if the UE already has four EPS bearers alive. In step 514, the network transmits another SM request to the UE to activate another dedicated EPS bearer context. In step 515, the UE determines the maximum number of EPS bearers is still n. Finally, in step 516, the UE rejects the SM request.

For 3GPP systems with inter-RAT, the maximum number of bearers is RAT-dependent. The number of active bearers may exceed the maximum number of bearers when the system/RAT changes. For example, the maximum number of bearers in 3G systems is n=4, while the maximum number of bearers in 4G systems is n=8. When the system changes from 4G to 3G, the UE may have more than four active bearers. In addition, the UE may have pending actions to establish more than four bearers. Under such scenario, the UE may re-determine the maximum bearer number for 3G. The UE may keep the original maximum bearer number, or update to a new maximum bearer number, or reset the maximum bearer number. The network may also provide the maximum number of bearers to the UE explicitly.

Figure 6:
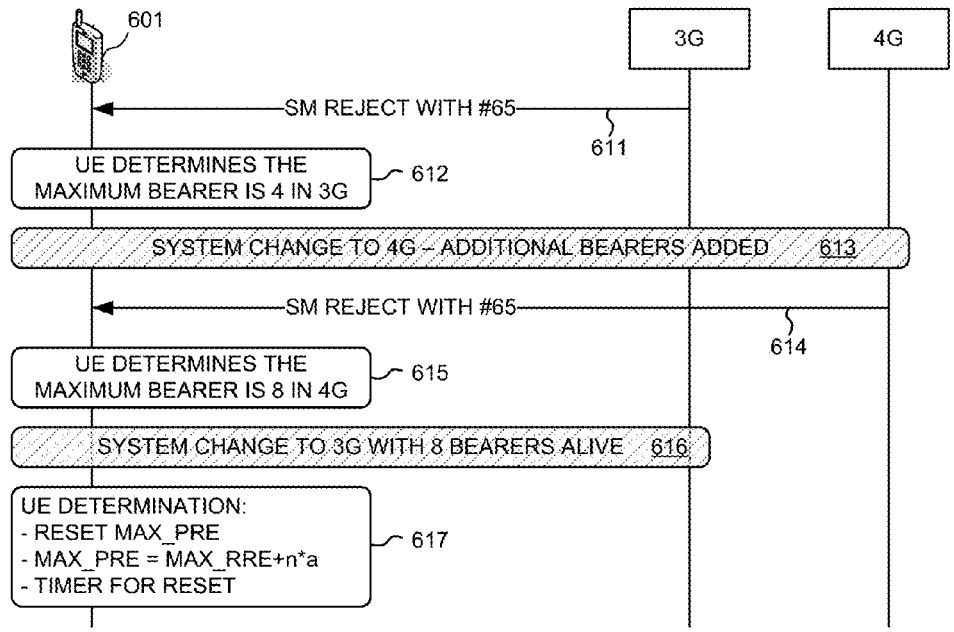
FIG. 6 illustrates a first embodiment of maintaining maximum number of bearers when system changes to a different RAT.

FIG. 6 illustrates a first embodiment of maintaining maximum number of bearers when system changes to a different RAT. In step 611, UE 601 receives an SM reject message from 3G network. The SM reject message comprises a cause code #65—"maximum number of bearers reached"—indicating that the UE has already reached its maximum number of bearers for 3G. In step 612, the UE determines the maximum number of bearers for 3G is n1 based on the cause code. For example, if the UE currently has four bearers alive when receiving the cause code, then the UE knows that the maximum number of bearers is n1=4. Upon such determination, the UE is prohibited from sending additional SM request to the network if the UE already has four bearers alive. In step 613, the system is changed from 3G to 4G. After changing to 4G, UE 601 continues to establish additional bearers for data service. In step 614, UE 601 receives an ESM reject message from 4G network. The ESM reject message comprises a cause code #65—"maximum number of EPS bearers reached"—indicating that the UE has already reached its maximum number of EPS bearers for 4G. In step 615, the UE determines the maximum number of EPS bearers for 4G is n2 based on the cause code. For example, if the UE currently has eight EPS bearers alive when receiving the cause code, then the UE knows that the maximum number of EPS bearers is n2=8. Upon such determination, the UE is prohibited from sending additional ESM request to the network if the UE already has eight bearers alive.

In step 616, the system is changed from 4G to 3G. In step 617, UE 601 determines the updated maximum bearer number (n1) for 3G based on several options under different scenarios. In a first option, the UE keeps the original maximum number of bearers for 3G (e.g., n1=4 as determined in step 612). In a second option, the UE updates the maximum number of bearers to a new number. For example, if the number of currently active bearers when the system changes to 4G is five, then the UE updates the maximum number of bearers for 3G is n1=5. In a third option, the UE resets the maximum number of bearers to be n1=0. If the UE resets the value to zero, then the UE will resync with the 3G network upon reception of an SM reject message with cause code #65.

In one specific example, during the system change from 4G to 3G in step 616, UE 601 have sent out additional pending actions for establishing additional bearers. Under such scenario, UE 601 can update the maximum number of bearers of the previous 3G system (denote as MAX_Pre) accurately by adopting the following mechanism. If there are n pending actions for activating new bearers upon system change, then MAX_Pre=MAX_Pre+n*α, where α is a factor related the successful rate of bearer establishment. In an alternative embodiment, UE 601 may reset the MAX_Pre upon system change. Furthermore, the UE may define a timer for resetting the MAX_Pre, and the timer may be RAT dependent or RAT independent.

Figure 7A:
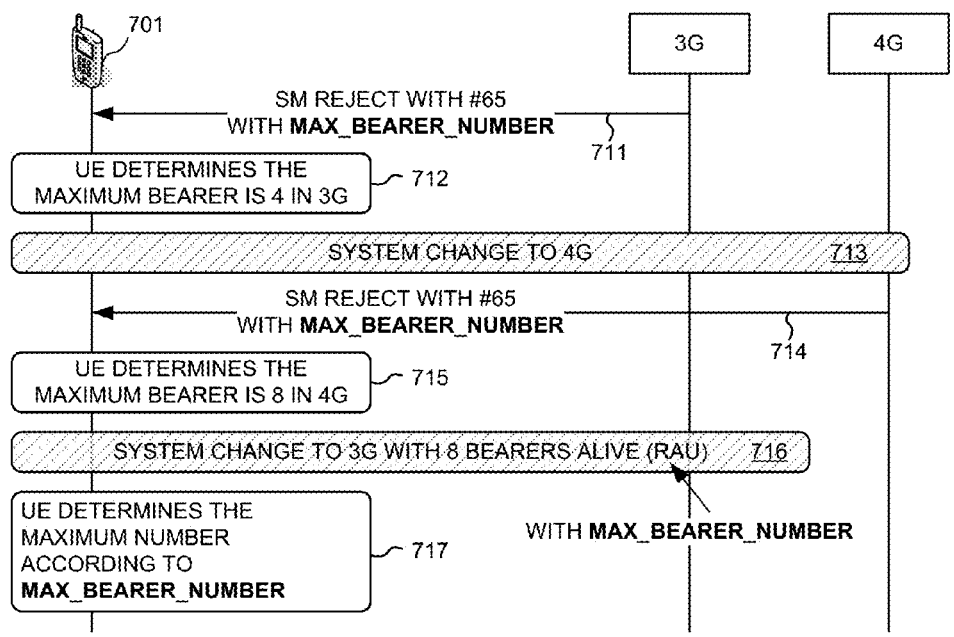
FIG. 7A illustrates a second embodiment of maintaining maximum number of bearers when system changes to a different RAT.

FIG. 7A illustrates a second embodiment of maintaining maximum number of bearers when system changes to a different RAT. This embodiment is similar to the embodiment of FIG. 6. However, in this embodiment, the network defines an information element (IE) for indicating the maximum number of bearers, which could be included in proper NAS massages including SM/ESM/MM/EMM messages. In step 711, UE 701 receives an SM reject message from 3G network. The SM reject message comprises a cause code #65—"maximum number of bearers reached"—indicating that the UE has already reached its maximum number of bearers for 3G. In addition, the SM reject message also indicates the MAX_BEARER_NUMBER 3G. In step 712, the UE determines the maximum number of bearers for 3G is MAX_BEARER_NUMBER 3G. In step 713, the system is changed from 3G to 4G. In step 714, UE 701 receives an ESM reject message from 4G network. The ESM reject message comprises a cause code #65—"maximum number of EPS bearers reached"—indicating that the UE has already reached its maximum number of EPS bearers for 4G. In addition, the ESM reject message also indicates the MAX_BEARER_NUMBER 4G. In step 715, the UE determines the maximum number of EPS bearers for 4G is MAX_BEARER_NUMBER 4G. In step 716, the system is changed from 4G to 3G. In one example, upon the system change, the 3G network sends MAX_BERER_NUMBER 3G to UE 701 via a routing area update (RAU) message. In step 717, UE 701 determines the maximum bearer number for 3G is MAX_BERER_NUMBER 3G, as explicitly indicated by the network. In an alternative embodiment, the maximum number of bearers can be included in proper NAS messages including MM/EMM RAU/TAU service request, e.g., PDP context status or EPS bearer context status.

Figure 7B:
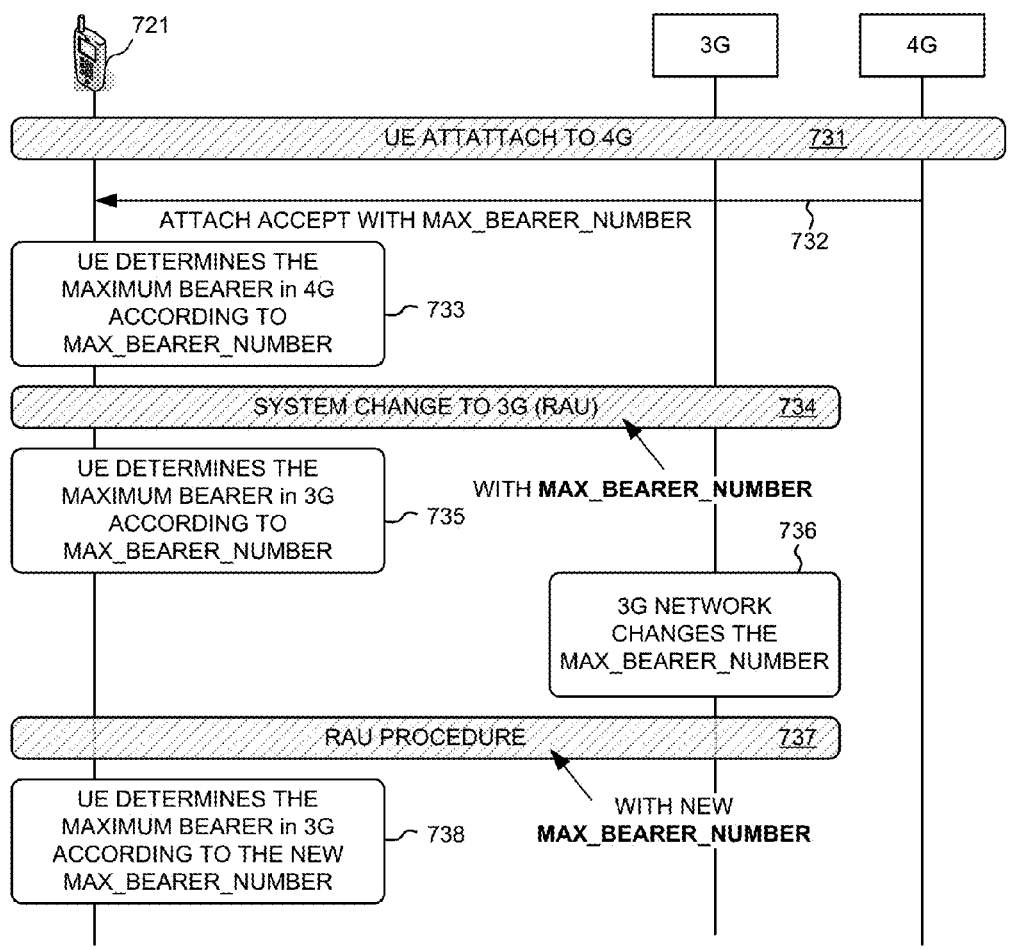
FIG. 7B illustrates one embodiment of maintaining maximum number of bearers by providing MAX_BEARER_NUMBER when system changes or when the maximum number changes in accordance with a novel aspect.

FIG. 7B illustrates one embodiment of maintaining maximum number of bearers by providing MAX_BEARER_NUMBER when system changes or when the maximum number changes. In step 731, UE 721 attaches to a 4G system. In step 732, UE 721 receives MAX_BEARER_NUMBER 4G from the network via attach accept. In step 733, the UE determines the maximum bearer number in 4G system according to the MAX_BEARER_NUMBER 4G. In step 734, the system is changed from 4G to 3G. In one example, upon the system change, the 3G network sends MAX_BERER_NUMBER 3G to UE 721 via a routing area update (RAU) message. In step 735, the UE determines the maximum bearer number in 3G system according to the MAX_BEARER_NUMBER 3G. In step 736, the 3G network changes the MAX_BEARER_NUMBER. In step 737, the 3G network sends a new MAX_BERER_NUMBER 3G to UE 721 via another RAU message. In step 738, the UE determines the maximum bearer number in 3G system according to the new MAX_BEARER_NUMBER 3G.

In accordance with one advantageous aspect, the maximum bearer number related cause-code (e.g., #65 or a new cause-code) could consider the following factors. First, usage related to emergency or attach or other special needs could be considered. For example, bearers of emergency usage should not be counted for the maximum bearer number check, and the default bearer(s) for attaching to the LTE network and other service networks for IMS or MMS (multimedia messaging service) should not be counted for the maximum bearer number check. Second, the maximum bearer number could be made APN-dependent. For example, #65 or a new cause value may be defined to indicate the maximum bearer number per APN. This can solve the issue that one PDN connection with higher priority is blocked due to maximum bearer number is reached by other PDN connections with lower priorities. When #65 is used to indicate the APN-dependent maximum bearer number, extra indication may be required.

Figure 8:
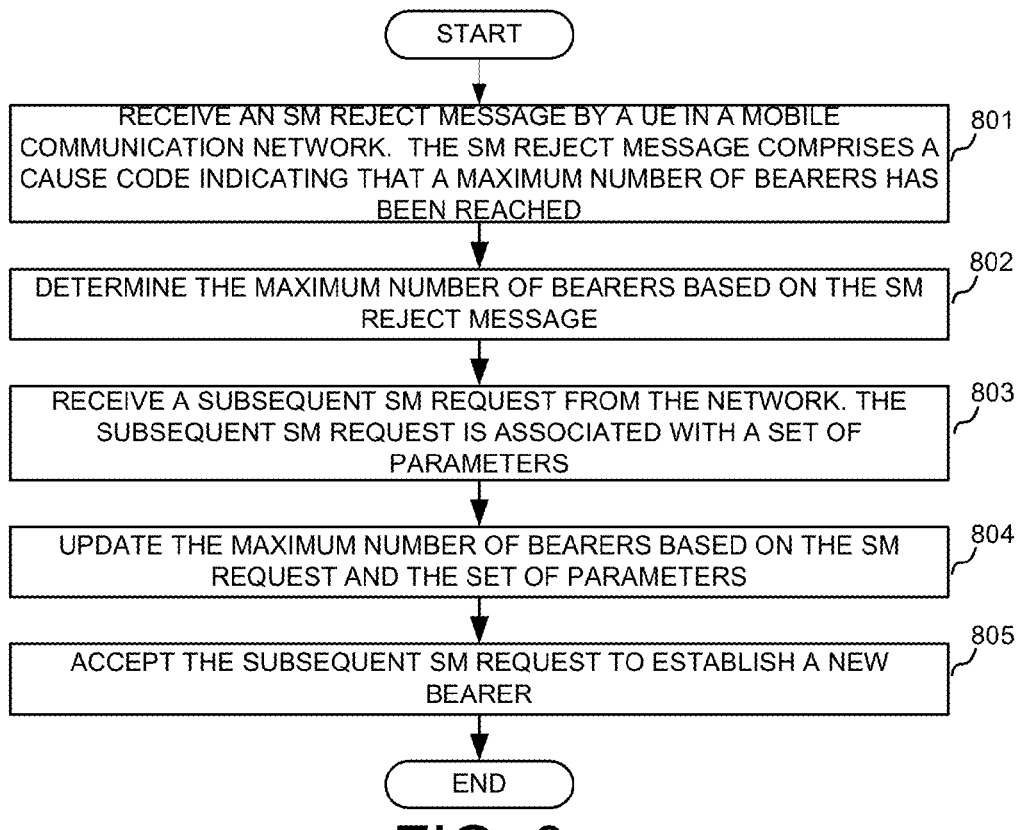
FIG. 8 illustrates a flow chart for a method of maintaining maximum number of bearers when maximum number of bearers reached from UE perspective in accordance with one novel aspect.

FIG. 8 illustrates a flow chart for a method of maintaining maximum number of bearers when maximum number of bearers reached from UE perspective in accordance with one novel aspect. In step 801, a UE receives a session management (SM) reject message in a mobile communication network. The SM reject message comprises a cause code indicating that a maximum number of bearers has been reached. In step 802, the UE determines the maximum number of bearers based on the SM reject message. In step 803, the UE receives a subsequent SM request from the network. The subsequent SM request is associated with a set of parameters. In step 804, the UE updates the maximum number of bearers based on the SM request and the set of parameters. In step 805, the UE accepts the subsequent SM request to establish a new bearer.

Figure 9:
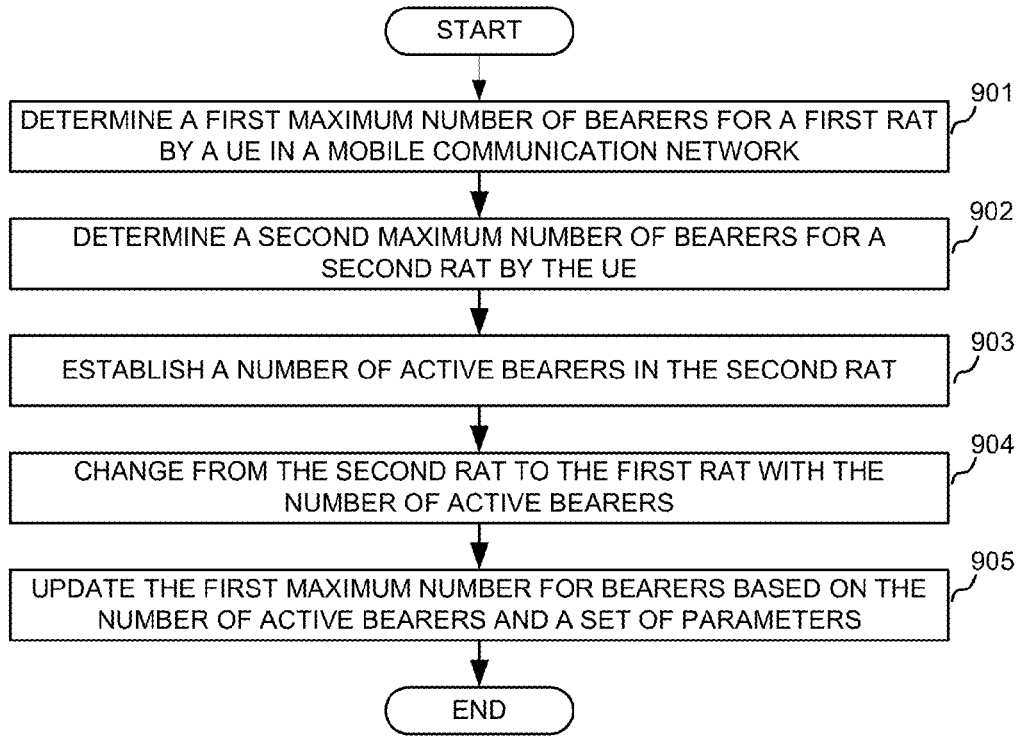
FIG. 9 illustrates a flow chart for a method of determining maximum number of bearers when system changes to a different RAT in accordance with embodiments of the current invention.

FIG. 9 illustrates a flow chart for a method of determining maximum number of bearers when system changes to a different RAT in accordance with embodiments of the current invention. In step 901, a UE determines a first maximum number of bearers for a first radio access technology (RAT) in a mobile communication network. In step 902, the UE determines a second maximum number of bearers for a second RAT. In step 903, the UE establishes a number of active bearers in the second RAT. In step 904, the UE changes from the second RAT to the first RAT with the number of active bearers. In step 905, the UE updates the first maximum number of bearers based on the number of active bearers and a set of parameters.

Figure 10:
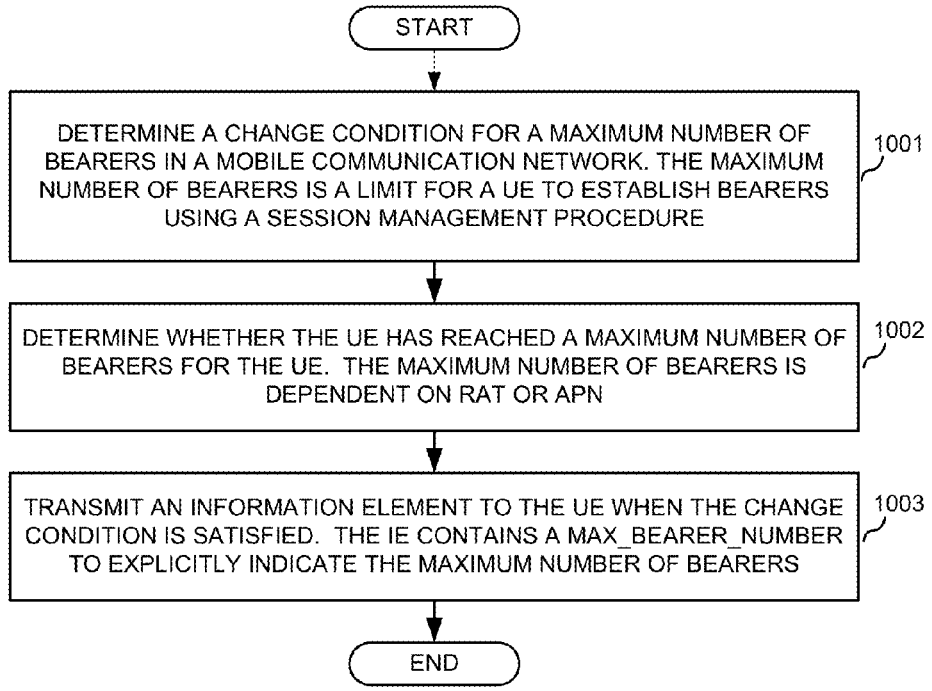
FIG. 10 illustrates a flow chart for a method of maintaining maximum number of bearers when maximum number of bearers reached from network perspective in accordance with one novel aspect.

FIG. 10 illustrates a flow chart for a method of maintaining maximum number of bearers when maximum number of bearers reached from network perspective in accordance with one novel aspect. In step 1001, the network determines a change condition for a maximum number of bearers in a mobile communication network. The maximum number of bearers is a limit for a UE to establish bearers using a session management procedure. In step 1002, the network determines whether the UE has reached the maximum number of bearers. The maximum number of bearers is dependent on a radio access technology (RAT) or an access point name (APN). In step 1003, the network transmits an information element (IE) to the UE when the change condition is satisfied. The IE contains a MAX_BEARER_NUMBER to explicitly indicate the maximum number of bearers. In one example, the change condition is satisfied when the UE has reached the maximum number of bearers, and wherein the IE is carried by an SM reject message. In another example, the change condition is satisfied when the UE encounters a RAT change, and wherein the IE is carried by a tacking area update (TAU) or a routing area update (RAU).

Figure 11:
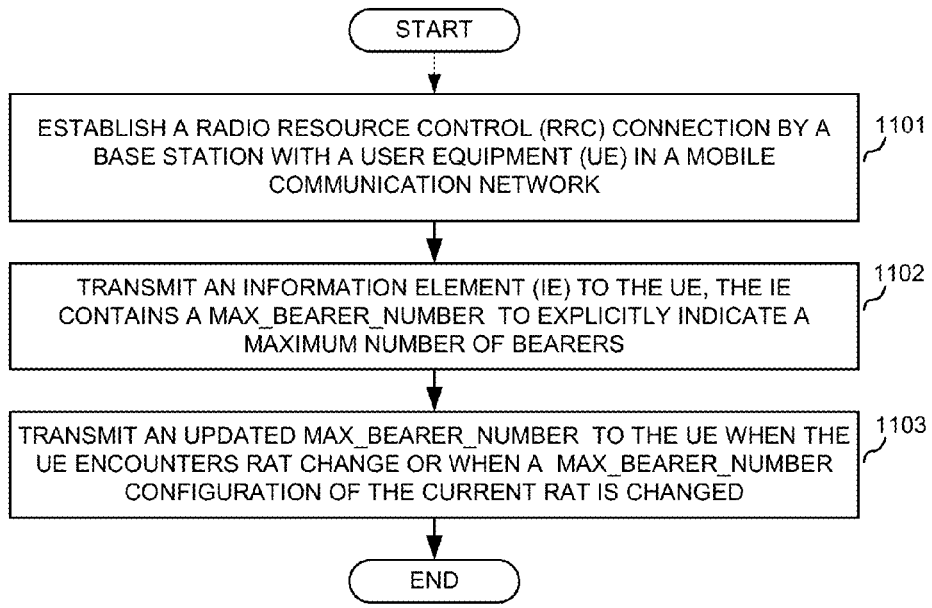
FIG. 11 illustrates a flow chart for a method of maintaining maximum number of bearers by providing MAX_BEARER_NUMBER.

FIG. 11 illustrates a flow chart for a method of maintaining maximum number of bearers by providing MAX_BEARER_NUMBER. In step 1101, a base station establishes a radio resource control (RRC) connection with a user equipment (UE) in a mobile communication network. In step 1102, the base station transmits an information element (IE) to the UE. The IE contains a MAX_BEARER_NUMBER to explicitly indicate a maximum number of bearers. In step 1103, the base station transmits an updated MAX_BEARER_NUMBER to the UE when the UE encounters a radio access technology (RAT) change or when a MAX_BEARER_NUMBER configuration of the current RAT is changed.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving a session management (SM) reject message by a user equipment (UE) in a mobile communication network, wherein the SM reject message comprises a cause code indicating that a maximum number of bearers has been reached while the UE has an existing number of established bearers connecting the UE with a first type of RAT;
determining the maximum number of bearers based on the SM reject message;
receiving a subsequent SM request from the network after receiving the SM reject message and the cause code, wherein the subsequent SM request is associated with a set of parameters including a second type of RAT different than the first type, and requests to activate a dedicated bearer context for a new bearer connecting the UE with the second type of RAT;
updating the maximum number of bearers based on the SM request and the set of parameters in response to the cause code, wherein the UE autonomously updates the maximum number of bearers that is radio access technology (RAT) dependent; and
accepting the subsequent SM request and establishing the new bearer while maintaining the existing number of established bearers.

2. The method of claim 1, wherein the set of parameters comprises a radio access technology (RAT), an access point name (APN), and a packet data network (PDN) type.

3. The method of claim 2, wherein the UE updates the maximum number of bearers based on the RAT.

4. The method of claim 2, wherein the UE keeps the maximum number of bearers the same if the APN and the PDN type remain the same.

5. The method of claim 2, wherein the UE modifies the maximum number of bearers by incrementing by one if the APN or the PDN type has changed.

6. The method of claim 2, wherein the UE resets the maximum number of bearers.

7. The method of claim 1, wherein the UE sends an SM request for establishing bearers when the maximum number of bearers has been reached, and wherein the SM request is for bearers for emergency usage or for attaching to a service network.

8. The method of claim 1, wherein the UE applies the maximum number of bearers associated with each access point name (APN).

9. A user equipment (UE), comprising:
- a radio frequency (RF) receiver that receives a session management (SM) reject message in a mobile communication network, wherein the SM reject message comprises a cause code indicating that a maximum number of bearers has been reached while the UE has an existing number of established bearers connecting the UE with a first type of RAT, wherein the UE also receives a subsequent SM request from the network after receiving the SM reject message and the cause code, and wherein the subsequent SM request is associated with a set of parameters including a second type of RAT different than the first type, and requests to activate a dedicated bearer context for a new bearer connecting the UE with the second type of RAT;
- a packet data network (PDN) connectivity handling circuit that determines the maximum number of bearers based on the SM reject message, wherein the UE updates the maximum number of bearers based on the SM request and the set of parameters in response to the cause code, wherein the UE autonomously updates the maximum number of bearers that is radio access technology (RAT) dependent; and
- a bearer resource allocation circuit that accepts the subsequent SM request and establish the new bearer while maintaining the existing number of established bearers.

10. The UE of claim 9, wherein the set of parameters comprises a radio access technology (RAT), an access point name (APN), and a packet data network (PDN) type.

11. The UE of claim 10, wherein the UE updates the maximum number of bearers based on the RAT.

12. The UE of claim 10, wherein the UE keeps the maximum number of bearers the same if the APN and the PDN type remain the same.

13. The UE of claim 10, wherein the UE modifies the maximum number of bearers by incrementing by one if the APN or the PDN type has changed.

14. The UE of claim 9, wherein the UE resets the maximum number of bearers.

15. The UE of claim 9, wherein the UE sends an SM request for establishing bearers when the maximum number of bearers has been reached, and wherein the SM request is for bearers for emergency usage or for attaching to a service network.

16. The UE of claim 9, wherein the UE applies the maximum number of bearers associated with each access point name (APN).

* * * * *